United States Patent
Kota et al.

(10) Patent No.: US 10,440,736 B2
(45) Date of Patent: Oct. 8, 2019

(54) SYSTEM AND METHOD FOR INCREASED THROUGHPUT USING QUEUE SIZE BASED INTELLIGENT PROPORTION CALCULATION REVERSE DIRECTION GRANTS

(71) Applicant: Avago Technologies International Sales Pte. Limited, Singapore (SG)

(72) Inventors: Prashant Kota, Bangalore (IN); Manish Airy, Bangalore (IN); Sandeep Ps, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 29 days.

(21) Appl. No.: 15/691,027

(22) Filed: Aug. 30, 2017

(65) Prior Publication Data

US 2019/0069318 A1    Feb. 28, 2019

(51) Int. Cl.
| | |
|---|---|
| *H04W 72/14* | (2009.01) |
| *H04W 74/08* | (2009.01) |
| *H04W 28/12* | (2009.01) |
| *H04W 28/06* | (2009.01) |
| *H04W 84/12* | (2009.01) |
| *H04W 88/08* | (2009.01) |
| *H04W 74/00* | (2009.01) |

(52) U.S. Cl.
CPC .......... *H04W 72/14* (2013.01); *H04W 28/06* (2013.01); *H04W 28/12* (2013.01); *H04W 74/0816* (2013.01); *H04W 74/0825* (2013.01); *H04W 74/002* (2013.01); *H04W 84/12* (2013.01); *H04W 88/08* (2013.01)

(58) Field of Classification Search
CPC . H04W 72/14; H04W 28/12; H04W 74/0825; H04W 28/06; H04W 88/08; H04W 84/12
See application file for complete search history.

(56) References Cited

U.S. PATENT DOCUMENTS

| | | | |
|---|---|---|---|
| 7,826,438 B1 | 11/2010 | Salhotra et al. | |
| 9,565,704 B2 | 2/2017 | Zhu | |
| 2010/0329195 A1* | 12/2010 | Abraham | H04W 52/42 |
| | | | 370/329 |
| 2011/0255618 A1 | 10/2011 | Zhu et al. | |
| 2012/0218947 A1 | 8/2012 | Merlin et al. | |
| 2013/0107895 A1* | 5/2013 | Wentink | H04L 69/04 |
| | | | 370/477 |
| 2013/0155931 A1 | 6/2013 | Prajapati et al. | |
| 2014/0126509 A1 | 5/2014 | You | |
| 2014/0233478 A1* | 8/2014 | Wentink | H04L 5/0055 |
| | | | 370/329 |
| 2014/0269544 A1 | 9/2014 | Zhu et al. | |
| 2015/0063257 A1 | 3/2015 | Merlin et al. | |

(Continued)

*Primary Examiner* — Min Jung
(74) *Attorney, Agent, or Firm* — Sterne, Kessler, Goldstein & Fox P.L.L.C.

(57) ABSTRACT

The present disclosure is directed to methods and apparatuses for increasing throughput of WLANs using queue size based intelligent reverse direction grants (RDGs). RDGs have been introduced in many WLANs to reduce the amount of overhead associated with variants of the CSMA/CD MAC protocol. Reducing overhead increases the WLANs achievable data throughput. However, RDGs are not intelligently used in WLANs, limiting their effectiveness.

20 Claims, 6 Drawing Sheets

(56) References Cited

U.S. PATENT DOCUMENTS

| | | |
|---|---|---|
| 2015/0124690 A1* | 5/2015 | Merlin .................. H04L 5/0055 370/312 |
| 2016/0100408 A1* | 4/2016 | Hedayat .............. H04L 65/4076 370/329 |
| 2017/0064741 A1 | 3/2017 | Zhou et al. |
| 2017/0332414 A1 | 11/2017 | Kneckt et al. |
| 2019/0069317 A1 | 2/2019 | Kota et al. |

\* cited by examiner

SYSTEM AND METHOD FOR INCREASED THROUGHPUT USING QUEUE SIZE BASED INTELLIGENT PROPORTION CALCULATION REVERSE DIRECTION GRANTS

FIELD OF THE INVENTION

This application relates generally to wireless networks, including reverse direction grants in wireless networks.

BACKGROUND

A wireless local area network (WLAN) is a network that communicatively couples two or more stations over a wireless medium within a limited geographic area. Many WLANs share the wireless medium between stations in the network using a variant of the basic medium access control (MAC) protocol called Carrier Sense Multiple Access with Collision Detection (CSMA/CD).

Using CSMA/CD, a station wanting to gain access to the wireless medium first checks to see if the wireless medium is clear from traffic. If the wireless medium is not clear from traffic, the station waits a random amount of time before retrying to gain access to the wireless medium. If, on the other hand, the wireless medium is clear from traffic, and the station begins transmitting at (or very near) the same time as another station, the two stations' signals will collide. When such a collision occurs, the two stations back off and wait respective amounts of random time before retrying to transmit.

In many WLANs, implementation of the CSMA/CD MAC protocol requires considerable overhead, especially for smaller packet sizes. Several improvements have been suggested to the basic CSMA/CD MAC protocol to reduce overhead and, thereby, increase data throughput. For example, in the Institute of Electrical and Electronics Engineers (IEEE) 802.11 WLANs, techniques such as packet aggregation and reverse direction grants (RDGs) have been introduced to reduce the amount of overhead associated with the CSMA/CD MAC protocol.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

1. Overview

As mentioned above, reverse direction grants (RDGs) have been introduced in many WLANs to reduce the amount of overhead associated with variants of the CSMA/CD MAC protocol. Reducing overhead increases the WLANs achievable data throughput. However, RDGs are not intelligently used in WLANs, limiting their effectiveness. The present disclosure is directed to methods and apparatuses for increasing throughput of WLANs using queue size based intelligent RDGs. Embodiments and features of the present disclosure are described further below with reference to the figures.

2. Exemplary Operating Environment

Figure 1:
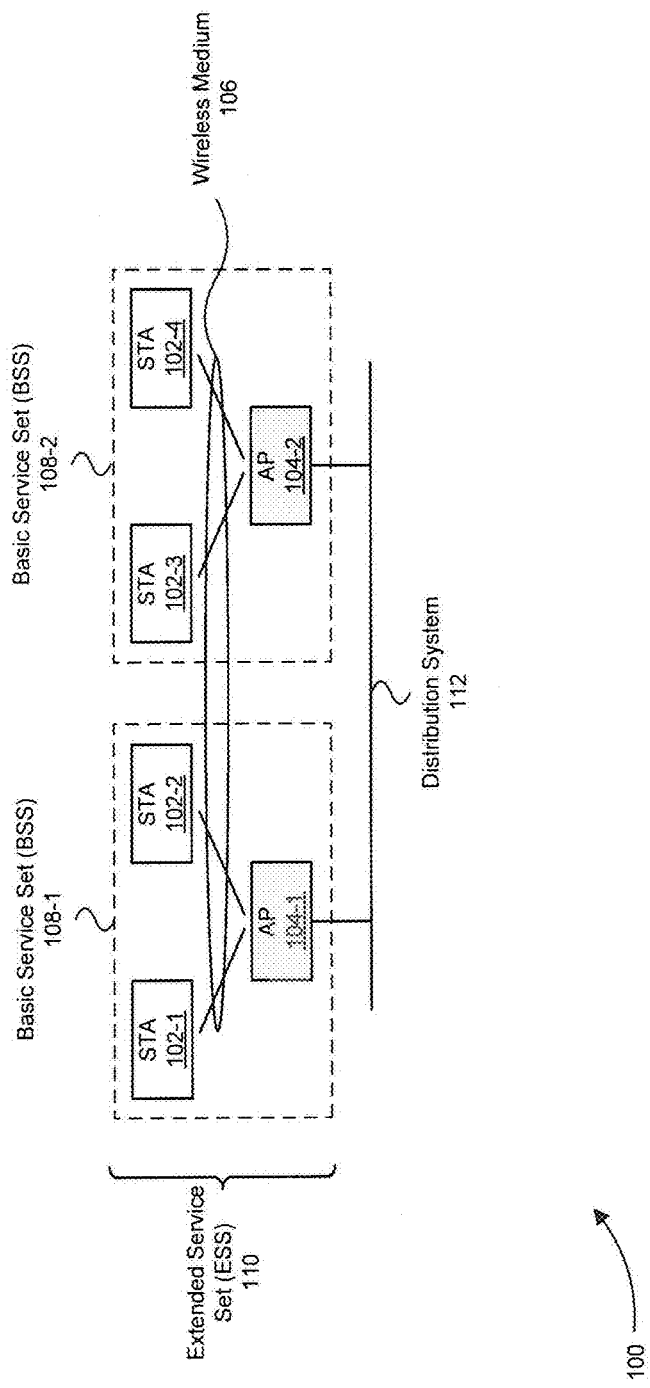
FIG. 1 illustrates an example wireless local area network (WLAN) in accordance with embodiments of the present disclosure.

FIG. 1 illustrates an exemplary WLAN 100 in which embodiments of the present disclosure can be implemented. WLAN 100 comprises several components: wireless stations (STAs) 102, access points (APs) 104, the wireless medium 106, basic service sets (BSSs) 108, an extended service set (ESS) 110, and a distribution system 112. Some of the components in WLAN 100 are optional and can be omitted in other implementations as would be appreciated by one of ordinary skill in the art.

In WLAN 100, each BSS 108 includes a set of STAs 102. STAs 102 within a BSS 108 can communicate with each other either directly over wireless medium 106 or indirectly over wireless medium 106 through an optional AP 104. STAs 102 can be mobile or stationary depending on the type of network device in which they are implemented. For example, STAs 102 can be implemented in smart phones, laptops, tablets, desktop computers, smart appliances, or any other device that requires access to WLAN 100. STAs 102 comprise a medium access controller (MAC) and physical layer device (PHY), which are implemented using hardware and software running on a processor, to communicate data over wireless medium 106. When used in BSSs 108, APs 104 can provide STAs 102 with access to a wired network, such a local area network or the internet, as well as provide a relay function to relay information between STAs 102 as mentioned above.

BSSs 108 can be interconnected via distribution system 112 to form ESS 110. ESS 110 allows those STAs 102 that are mobile to move between BSSs 108 while maintaining a connection to WLAN 100. APs 104 can communicate with each other over distribution system 112 to forward traffic between BSSs 108. Distribution system 112 can be either wired (as shown) or wireless.

3. WLAN MAC Protocol and RDGs

As explained above, many WLANs share the wireless medium between STAs using a variant of the basic MAC protocol called Carrier Sense Multiple Access with Collision Detection (CSMA/CD). Using CSMA/CD, an STA wanting to acquire a transmission opportunity (TXOP) during which network layer data can be transmitted over the wireless medium to another STA first checks to see if the wireless medium is clear from traffic. If the wireless medium is not clear from traffic, the STA waits a random amount of time before retrying to gain access to the wireless medium. If, on the other hand, the wireless medium is clear from traffic, and the STA begins transmitting at (or very near) the same time as another STA, the two stations' signals will collide. When such a collision occurs, the two STAs back off and wait respective amounts of random time before retrying to transmit.

Figure 2:
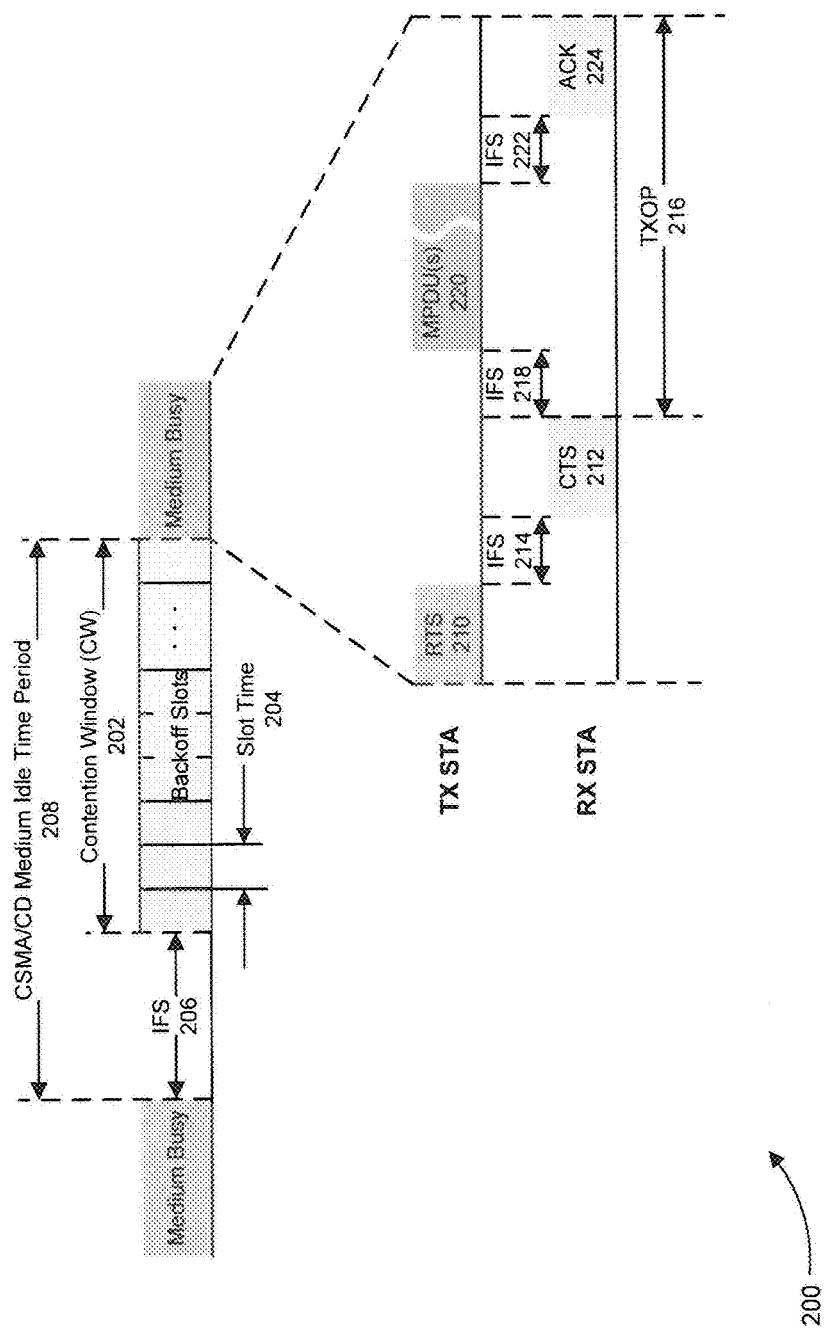
FIG. 2 illustrates an example Carrier Sense Multiple Access with Collision Detection (CSMA/CD) scheme in accordance with embodiments of the present disclosure.

FIG. 2 illustrates a more specific example of a CSMA/CD based scheme 200 that is used by IEEE 802.11 WLANs to share the wireless medium. CSMA/CD scheme 200 can be implemented, for example, by STAs 102 and APs 104 in WLAN 100 in FIG. 1 to share wireless medium 106. In scheme 200, an STA trying to acquire a TXOP during which network layer data can be transmitted over the wireless medium must first determine a random integer back-off time between zero and an upper bound size for a contention window (CW) 202. The STA then sets a back-off counter equal to the determined random back-off time and decrements the back-off counter for each slot time 204 that the wireless medium is clear from traffic after an inter frame space (IFS) 206. If traffic is sensed on the wireless medium after IFS 206, decrementing of the back-off counter is paused until the wireless medium is once again clear from traffic for a period of time equal to IFS 206. The STA attempts to transmit when its back-off counter reaches zero (which, although not shown in FIG. 2, may be before the end of CW 202).

If the STA transmission ends up colliding with the transmission of another STA, the STA can increase the size of CW 202 (i.e., the upper bound of CW 202), determine a new random back-off time, and use the new random back-off time to perform the random back-off process again before attempting another retransmission. The STAs typically do not attempt to directly detect collisions due to the known hidden node problem. Instead, a handshaking method is implemented, where the STA attempting to gain access to the wireless medium (labeled "TX STA" in FIG. 2) first transmits a Request to Send frame (RTS) 210 to a recipient STA (labeled "RX STA" in FIG. 2). If the RX STA receives the frame successfully without corruption from a colliding transmission (as is assumed in FIG. 2), the RX STA transmits a Clear to Send frame (CTS) 212 after an IFS 214.

The time period after CTS 212 is sent is the transmission opportunity (TXOP) 216 acquired by the TX STA. After another IFS 218, the TX STA can begin to transmit one or more MAC packet data units (MPDUs) 220, containing network layer data, during TXOP 216. Although not shown in FIG. 2, the one or more MPDU(s) 220 are encapsulated in a physical layer packet data unit (PPDU) before being transmitted over the wireless medium. After successful receipt of MPDU(s) 220 and yet another IFS 222, the RX STA sends an acknowledgment frame (ACK) 224 to the TX STA. ACK 224 can be a block ACK that individually acknowledges successful or unsuccessful receipt of the one or more MPDU(s) 220.

Scheme 200 allows controlled, shared access to the wireless medium by several STAs. However, as shown in FIG. 2, scheme 200 also requires considerable overhead before the network layer data contained in MPDU(s) 220 can be sent. This overhead includes, for example, the idle time period 208 associated with the CSMA/CD MAC protocol. During the idle time period 208, the wireless medium is idle and carries no data traffic.

Figure 3:
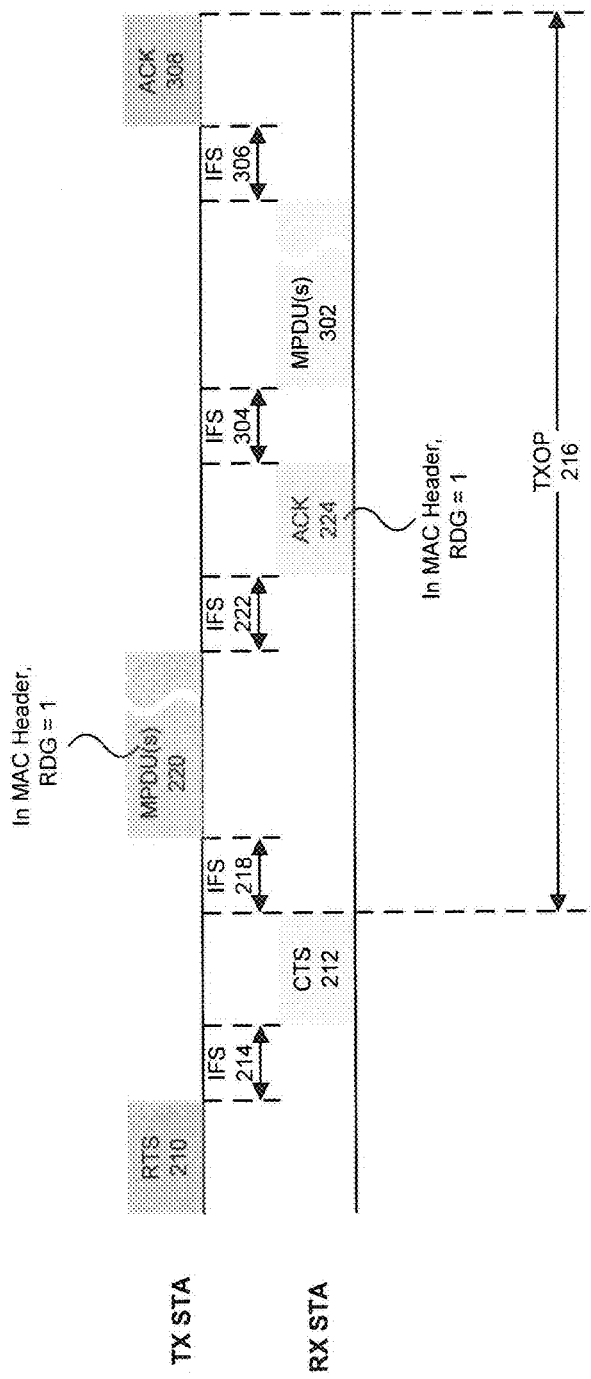
FIG. 3 illustrates use of the reverse direction grant (RDG) protocol during a transmission opportunity in accordance with embodiments of the present disclosure.

To reduce this overhead and increase data throughput, the RDG protocol was introduced into IEEE 802.11 WLANs. Using the RDG protocol, TXOP 216 can be made bi-directional to allow the RX STA an opportunity to transmit network layer data to the TX STA without have to contend for another TXOP, thereby reducing overhead. FIG. 3 illustrates a modified version of the traffic pattern between the TX STA and the RX STA illustrated in FIG. 2 that uses the RDG protocol.

To provide a portion of TXOP 216 (or relinquish a portion of TXOP 216) to RX STA to transmit network layer data to the TX STA over the wireless medium, the TX STA can set an RDG/More PPDU bit in the HTC field (or some other equivalent field) in the header of one or more of MPDU(s) 220 to a logical value of "1" (or some other appropriate value). If the RX STA has network layer data to send to the TX STA, the RX STA can set an RDG field in the header of ACK 224 to a logical value of "1" (or some other appropriate value). After receiving ACK 224 with its RDG/More PPDU bit in the HTC field (or some other equivalent field) set to "0", the TX STA will wait for one or more MPDU(s) 302 from the RX STA after an IFS 304. After successful receipt of MPDU(s) 302 and yet another IFS 306, TX STA sends an ACK 308 to the RX STA. ACK 308 can be a block ACK that individually acknowledges successful or unsuccessful receipt of the one or more MPDU(s) 302.

Although the RDG protocol helps to reduce overhead by eliminating the need for RX STA to contend for another TXOP to transmit to the TX STA over the wireless medium, the RDG protocol is not intelligently utilized in the scheme presented in FIG. 3. In particular, the TX STA does not know and/or consider how much network layer data that the RX STA has to send to the TX STA before acquiring TXOP 216 for a duration specified in RTS 210. As a result, TX STA may acquire TXOP 216 with a duration beyond what is necessary or relinquish a portion of the TXOP 216 to the RX STA when the RX STA has nothing to send, resulting in wasted time on the wireless medium. Described below are methods and apparatuses for solving this inefficiency using queue size based intelligent RDGs.

4. Queue Size Based Intelligent RDGs

Figure 4:
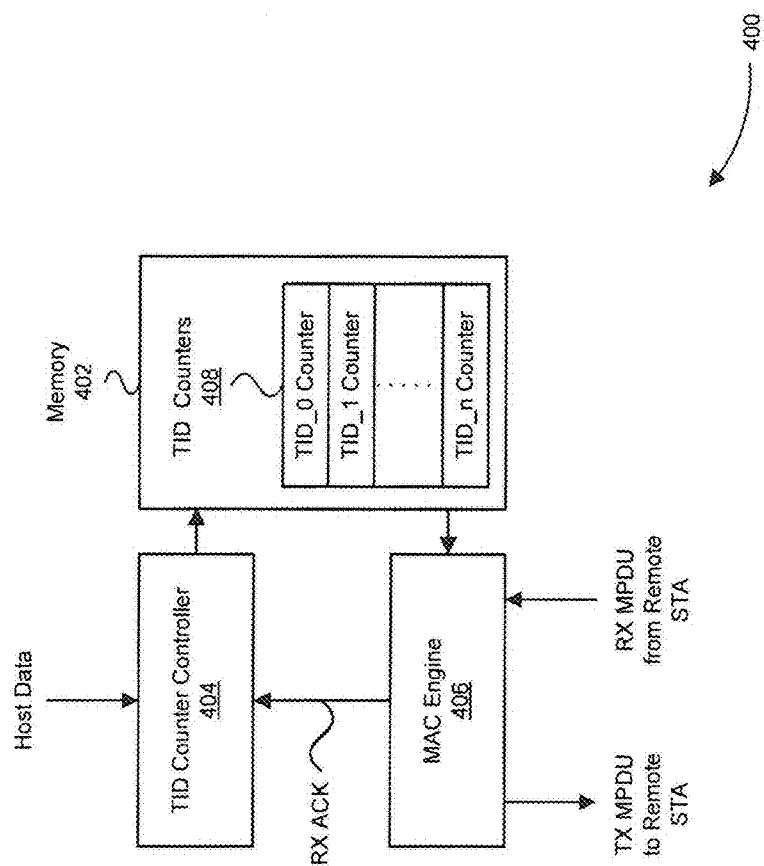
FIG. 4 illustrates a block diagram of an example wireless station with support for traffic identifier (TID) queue size based intelligent RDGs in accordance with embodiments of the present disclosure.

FIG. 4 illustrates an example block diagram of a portion of an STA 400 with support for traffic identifier (TID) specific queue size based intelligent RDGs in accordance with embodiments of the present disclosure. STA 400 can be, for example, one of STAs 102 or APs 104 in FIG. 1. As shown in FIG. 4, STA 400 comprises a memory 402 (e.g., a random access memory or series of registers), a TID counter controller 404, and a MAC engine 406.

TID counter controller 404 is configured to increment and decrement one or more TID counters 408 stored in memory 402 for a connection established between STA 400 and a remote STA (not shown). It should be noted that multiple connections can be established between STA 400 and other STAB and each such connection would have a group of TID counters 408. However, only one such group of TID counters is shown in FIG. 4 for clarity purposes. In one embodiment, each TID counter in TID counter 408 can maintain a count (e.g., in bytes or bits) of data to be transmitted to the remote STA corresponding to a different traffic type or some other categories of data types. Traffic types can include, for example, background, best effort, video, and voice.

As host data (i.e., network layer data) is received from a host application (not shown) for transmission over the wireless medium to the remote STA, TID counter controller 404 can increment the TID counter in TID counters 408 corresponding to the traffic type of the host data based on the amount of host data received. TID counter controller 404 can further decrement TID counters 408 after receiving an acknowledgement (RX ACK) of successful receipt of the host data by the remote STA after it has been transmitted. In this way, TID counter controller 408 can keep track of the amount of data belonging to each traffic type that is currently pending transmission.

When transmitting an MPDU (TX MPDU) to the remote STA, MAC engine 406, which implements the MAC of STA 400, can insert the value of one or more of TID counters 408 in the header of the MPDU. For example, MAC engine 406 can insert the value of one or more of TID counters 408 in a queue size sub-field of the Quality of Service (QoS) field in the header of the TX MPDU transmitted to the remote STA.

The remote STA can subsequently use the one or more TID counter values in the TX MPDU to intelligently calculate a time duration for a TXOP, during which the RDG protocol is used, and the proportion of the TXOP to be used by each station. For example, the remote STA can acquire a TXOP using the process described above in regard to FIGS. 2 and 3 to transmit data of a particular traffic type to STA 400 and receive, using the RDG protocol, data of the particular traffic type from STA 400 (although additional or different traffic types can be used). The remote STA can use the knowledge of the amount of data of the particular traffic type it has to send to STA 400 together with the amount of data of the particular traffic type that STA 400 has to send (which was previously received by the remote STA in the TX MPDU) to intelligently calculate the time duration for the TXOP so that it does not greatly exceed what is required to complete the transfer in addition to calculating the proportion of the TXOP to be used by each station. For example, the remote STA can calculate the duration for the TXOP to be exactly long enough for both STAs to transmit all data of the particular traffic type each STA has to the other STA during the TXOP.

Similar to the above, STA 400 can receive an MPDU (RX MPDU) from the remote STA with a TID counter value that reflects the amount of data that the remote STA has to send to STA 400 for a particular traffic types. MAC engine 406 can extract the counter value in the RX MPDU from the remote station to intelligently calculate a time duration for a TXOP and the proportion of the TXOP to be used by each station. For example, MAC engine 406 of STA 400 can acquire a TXOP using the process described above in regard to FIGS. 2 and 3 to transmit data of a particular traffic type to the remote STA and receive, using the RDG protocol, data of the particular traffic type from the remote STA (although additional or different traffic types can be used). In one embodiment, MAC engine 406 of STA 400 sends Transmission Control Protocol (TCP) packets during the TXOP and receives TCP acknowledgment packets from the remote STA during the portion of the TXOP relinquished to the remote STA. MAC engine 406 of STA 400 can use the knowledge of the amount of data of the particular traffic type it has to send to the remote STA (maintained by one of the TID counters in memory 402) together with the amount of data of the particular traffic type that the remote STA has to send (which was previously received by the remote STA in the RX MPDU) to calculate the duration for the TXOP so that it does not greatly exceed what is required to complete the transfer in addition to calculating the proportion of the TXOP to be used by each station. For example, MAC engine 406 of STA 400 can calculate the time duration for the TXOP to be exactly long enough for both STAs to transmit all data of the particular traffic type to the other STA during the TXOP. MAC engine 406 of STA 400 can specify the duration in an RTS, such as RTS 210, as described above.

In addition to the above, MAC engine 406 can relinquish control of the TXOP to the remote STA using the RING protocol at a time determined based on the value of the TID counter in memory 402 corresponding to the particular traffic type or based on the value of the TID counter corresponding to the particular traffic type that was received in the RX MPDU.

Figure 5:
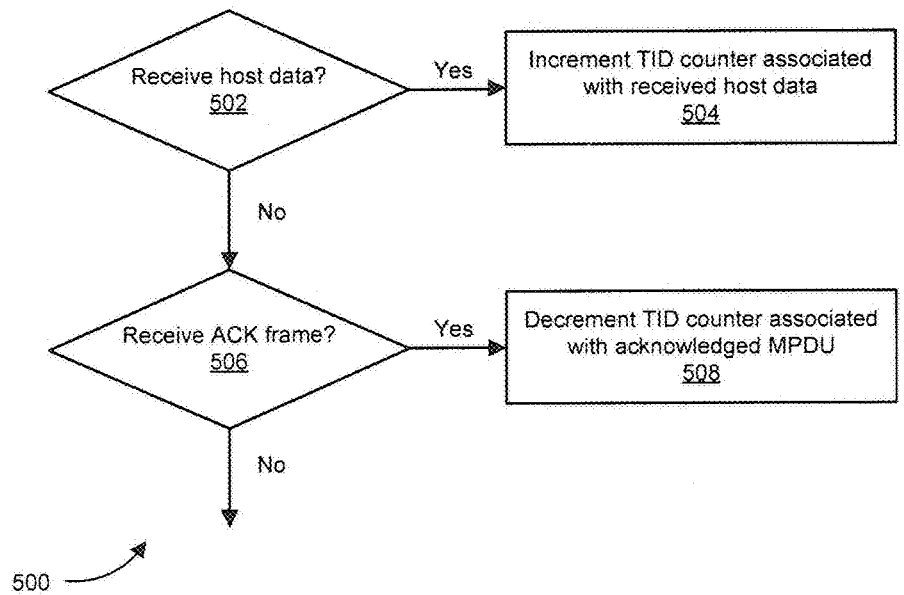
FIG. 5 illustrates a flowchart of a method for maintaining counters for TID queues in accordance with embodiments of the present disclosure.

Referring now to FIG. 5, a flowchart 500 of a method for maintaining values of TID counters, such as TID counters 408 in FIG. 4 is illustrated in accordance with embodiments of the present disclosure. In one embodiment, the method of flowchart 500 is implemented by TID counter controller 404 in FIG. 4. However, it should be noted that the method of flowchart 500 can be implemented by other hardware and/or software based controllers. It should also be noted that although decision steps 502 and 506 are shown in flowchart 500 as being sequentially executed with step 502 performed before step 506, in other embodiments these two steps can be implemented in parallel or in opposite order.

The method of flowchart 500 begins at step 502. At step 502, a determination is made as to whether host data has been received. Host data can include, for example, network layer data.

If host data has been received at step 502, the method of flowchart 500 proceeds to step 504. At step 504, the TID counter associated with the received data (e.g., the TID counter corresponding to the traffic type of the received data) is incremented by the amount of the received data. For example, the TID counter can be incremented based on the number of bytes or bits in the received data. Although not shown in FIG. 4, the method of 500 can proceed to step 506 from step 504.

If at step 502, the opposite determination is made that no host data is received, the method of flowchart 500 can proceed instead to step 506. At step 506, a determination as to whether an ACK frame is received from a remote STA over the wireless medium is made. The ACK frame can include an indication as to whether one or more MPDUs sent from the STA executing the method of flowchart 500 were successfully or not successfully received by the remote STA.

If an ACK frame is determined to have been received at step 506, the method of flowchart 500 proceeds to step 508. For those one or more MPDUs that were successfully received as indicated in the received ACK frame, the TID counter associated with data in those successfully received MPDUs can be deceeremented by the amount of data carried by those MPDUs. Although not shown in FIG. 5, the method of 500 can proceed back to step 502 from step 508.

If at step 506, the opposite determination is made that no ACK frame is received, the method of flowchart 500 can proceed, although not shown in FIG. 5, back to step 502.

Figure 6:
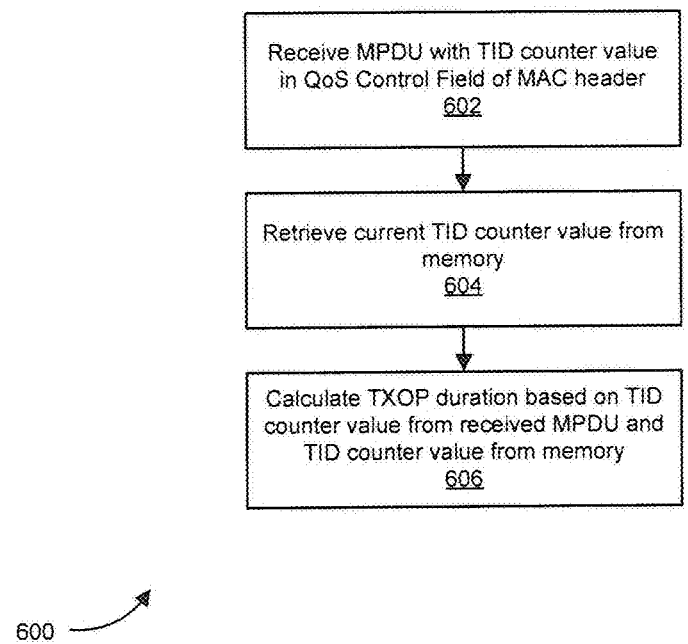
FIG. 6 illustrates a flowchart of a method for calculating a TXOP duration, in line with a queue size based intelligent RDG, in accordance with embodiments of the present disclosure.

FIG. 6 illustrates a flowchart 600 of a method for calculating a TXOP duration in accordance with embodiments of the present disclosure. The method of flowchart 600 allows for queue size based intelligent RDGs to be used in a WLAN as described above. In one embodiment, the method of flowchart 600 is implemented by MAC Engine 406 in FIG. 4. However, it should be noted that the method of flowchart 600 can be implemented by other hardware/software based devices.

The method of flowchart 600 begins at step 602. At step 602, the MAC engine of the STA implementing the method of flowchart 600 receives an MPDU from a remote STA. The received MPDU includes a TID counter value in a QoS field of the MAC header.

After the TID counter value is received at step 602, the method of flowchart 600 proceeds to step 604. At step 604, a current TID counter value is retrieved from the memory of the STA implementing the method of flowchart 600. In one embodiment, the current TID counter value retrieved from the memory has the same associated traffic type as that of the TID counter value received at step 602.

After the TID counter value is retrieved from the memory at step 604, the method of flowchart 600 proceeds to step 606. At step 606, a time duration for a TXOP is calculated based on the TID counter value received in the MPDU at step 602 and the TID counter value retrieved from the memory at step 604. For example, the calculation can involve determining the sum of the two counter values. The TXOP will be requested by the STA implementing the method of flowchart 600 to obtain access to the wireless medium to transmit data to the remote STA as well as to receive data from the remote STA using the RDG protocol. The time duration for the TXOP can be calculated at step 606 so that it does not greatly exceed what is required to complete the transfer of data associated with the TID counter received at step 602 and the TID counter retrieved at step 604. For example, the time duration of the TXOP can be calculated to be exactly long enough for both STAs to transmit all data of the particular traffic type corresponding to the two counter values during the TXOP. In addition, although not shown in flowchart 600, the proportion of the TXOP to be used by each station can further be calculated at step 606 based on the TID counter value received in the MPDU at step 602 and the TID counter value retrieved from the memory at step 604.

5. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 7:
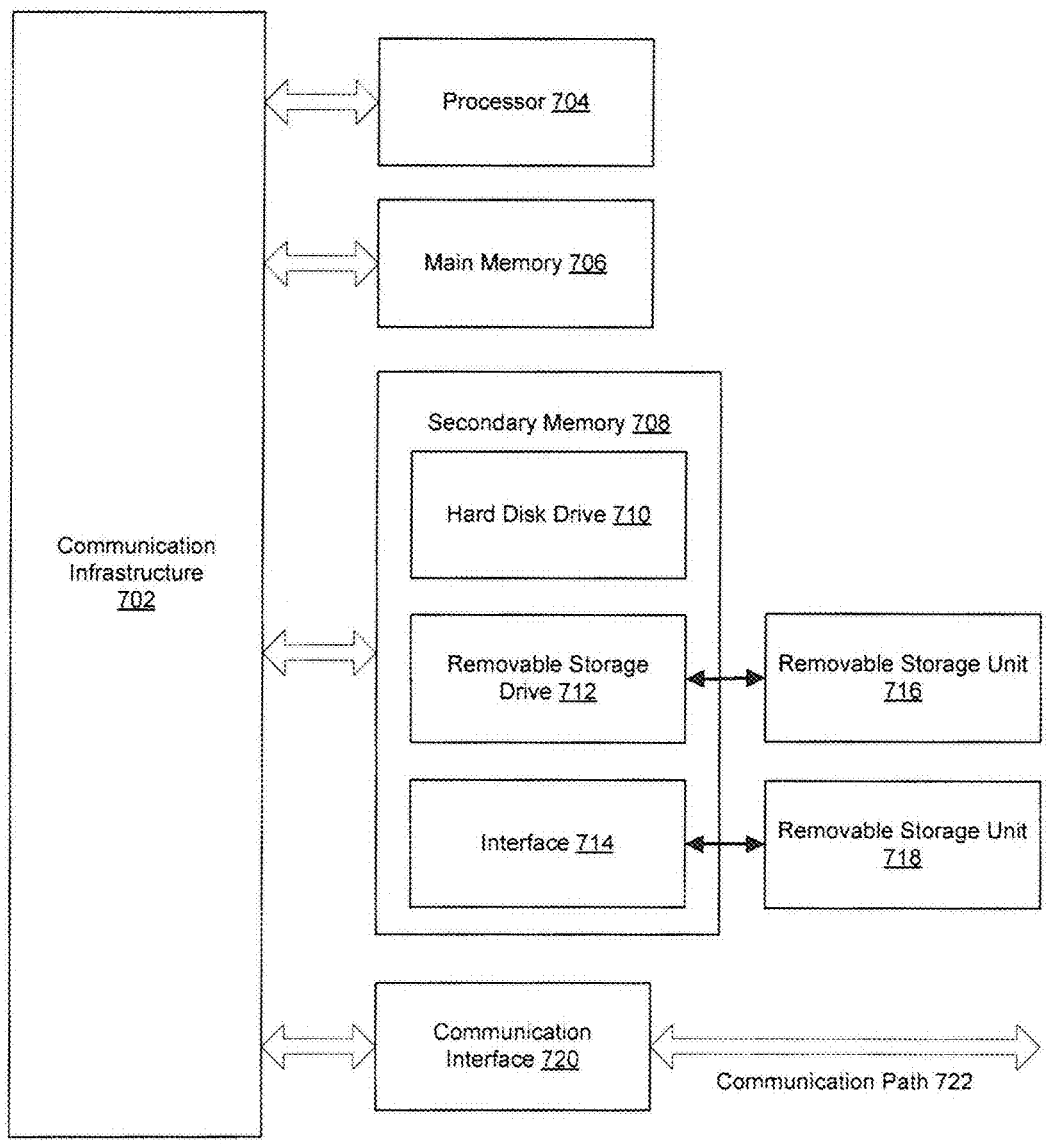
FIG. 7 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 700 is shown in FIG. 7. Components depicted in FIG. 4 may execute on one or more computer systems 700. Furthermore, each of the steps of the methods depicted in FIG. 5 and FIG. 6 can be implemented on one or more computer systems 700.

Computer system 700 includes one or more processors, such as processor 704. Processor 704 can be a special purpose or a general purpose digital signal processor. Processor 704 is connected to a communication infrastructure 702 (for example, a bus or network). Various software implementations are described in terms of this exemplary computer system. After reading this description, it will become apparent to a person skilled in the relevant art(s) how to implement the disclosure using other computer systems and/or computer architectures.

Computer system 700 also includes a main memory 706, preferably random access memory (RAM), and may also include a secondary memory 708. Secondary memory 708 may include, for example, a hard disk drive 710 and/or a removable storage drive 712, representing a floppy disk drive, a magnetic tape drive, an optical disk drive, or the like. Removable storage drive 712 reads from and/or writes to a removable storage unit 716 in a well-known manner. Removable storage unit 716 represents a floppy disk, magnetic tape, optical disk, or the like, which is read by and written to by removable storage drive 712. As will be appreciated by persons skilled in the relevant art(s), removable storage unit 716 includes a computer usable storage medium having stored therein computer software and/or data.

In alternative implementations, secondary memory 708 may include other similar means for allowing computer programs or other instructions to be loaded into computer system 700. Such means may include, for example, a removable storage unit 718 and an interface 714. Examples of such means may include a program cartridge and cartridge interface (such as that found in video game devices), a removable memory chip (such as an EPROM, or PROM) and associated socket, a thumb drive and USB port, and other removable storage units 718 and interfaces 714 which allow software and data to be transferred from removable storage unit 718 to computer system 700.

Computer system 700 may also include a communications interface 720. Communications interface 720 allows software and data to be transferred between computer system 700 and external devices. Examples of communications interface 720 may include a modem, a network interface (such as an Ethernet card), a communications port, a PCM-CIA slot and card, etc. Software and data transferred via communications interface 720 are in the form of signals which may be electronic, electromagnetic, optical, or other signals capable of being received by communications interface 720. These signals are provided to communications interface 720 via a communications path 722. Communications path 722 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 716 and 718 or a hard disk installed in hard disk drive 710. These computer program products are means for providing software to computer system 700.

Computer programs (also called computer control logic) are stored in main memory 706 and/or secondary memory 708. Computer programs may also be received via communications interface 720. Such computer programs, when executed, enable the computer system 700 to implement the present disclosure as discussed herein. In particular, the computer programs, when executed, enable processor 704 to implement the processes of the present disclosure, such as any of the methods described herein. Accordingly, such computer programs represent controllers of the computer system 700. Where the disclosure is implemented using software, the software may be stored in a computer program product and loaded into computer system 700 using removable storage drive 712, interface 714, or communications interface 720.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

5. Conclusion

Embodiments have been described above with the aid of functional building blocks illustrating the implementation of specified functions and relationships thereof The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within, the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A wireless local area network (WLAN) station comprising:
    a memory for storing a traffic identifier (TID) counter, wherein the TID counter represents an amount of first network layer data to be transmitted by the WLAN station;
    a TID counter controller configured to increment and decrement the TID counter in the memory; and
    a media access control (MAC) engine configured to calculate a proportion of a transmission opportunity (TXOP) for a remote WLAN station to transmit second network layer data based on a value of the TID counter in the memory and a value of a TID counter in the remote WLAN station, wherein the TXOP is obtained by the WLAN station during a contention window.

2. The WLAN station of claim 1, wherein the value of the TID counter in the remote WLAN station is received by the MAC engine from the remote WLAN station in a MAC header.

3. The WLAN station of claim 1, wherein the MAC engine is further configured to relinquish the TXOP to the remote WLAN station at a time determined based on the value of the TID counter in the memory or the value of the TID counter in the remote WLAN station.

4. The WLAN station of claim 3, wherein the MAC engine is further configured to relinquish the TXOP to the remote WLAN station at the time using a reverse direction grant (RDG) to the remote WLAN station.

5. The WLAN station of claim 1, wherein the MAC engine is further configured to transmit a time duration value of the TXOP in a request to send (RTS) frame to the remote WLAN station, wherein the time duration value indicates a time duration of the TXOP.

6. The WLAN station of claim 1, wherein the MAC engine is further configured to transmit the value of the TID counter in the memory to the remote WLAN station.

7. The WLAN station of claim 1, wherein one of the WLAN station or the remote WLAN station is an access point.

8. The WLAN station of claim 1, wherein the MAC engine is further configured to transmit transmission control protocol (TCP) data to the remote WLAN station during the TXOP and receive TCP acknowledgments from the remote WLAN station during the TXOP.

9. A method comprising:
    maintaining a traffic identifier (TID) counter in memory, wherein the TID counter represents an amount of first network layer data to be transmitted by a wireless local area network (WLAN) station;
    calculating a proportion of a transmission opportunity (TXOP) for a remote WLAN station to transmit second network layer data during the TXOP based on a value of the TID counter in the memory and a value of a TID counter in the remote WLAN station, wherein the TXOP is obtained by the WLAN station; and
    transmit a time duration value of the TXOP in a request to send (RTS) frame to the remote WLAN station, wherein the time duration value indicates a time duration of the TXOP.

10. The method of claim 9, further comprising:
    receiving the value of the TID counter in the remote WLAN station from the WLAN station in a media access control (MAC) header.

11. The method of claim 9, further comprising:
    relinquishing the TXOP to the remote WLAN station at a time determined based on the value of the TID counter in the memory or the value of the TID counter in the remote WLAN station.

12. The method of claim 11, further comprising:
    relinquishing the TXOP to the remote WLAN station at the time using a reverse direction grant (RDG) to the remote WLAN station.

13. The method of claim 9, further comprising:
    transmitting the value of the TID counter in the memory to the remote WLAN station.

14. The method of claim 9, wherein the remote WLAN station is an access point.

15. A wireless local area network (WLAN) station comprising:
- a memory for storing a traffic identifier (TID) counter, wherein the TID counter represents an amount of network layer data to be transmitted by the WLAN station;
- a TID counter controller configured to increment and decrement the TID counter in the memory; and
- a media access control (MAC) engine configured to:
  - calculate a proportion of a transmission opportunity (TXOP) for the WLAN station to transmit the network layer data during the TXOP based on a value of the TID counter in the memory and a value of a TID counter in a remote WLAN station, and
  - relinquish, using a reverse direction grant (RDG), the TXOP to the remote WLAN station at a time determined based on the proportion of the TXOP for the WLAN station to transmit the network layer data during the TXOP.

16. The WLAN station of claim 15, wherein the value of the TID counter in the remote WLAN station is received by the MAC engine from the remote WLAN station in a MAC header.

17. The WLAN station of claim 15, wherein the MAC engine is further configured to calculate a time duration value of the TXOP and transmit the time duration value in a request to send (RTS) frame, wherein the time duration value indicates a time duration of the TXOP.

18. The WLAN station of claim 15, wherein the MAC engine is further configured to transmit the value of the TID counter in the memory to the remote WLAN station.

19. The WLAN station of claim 15, wherein one of the WLAN station or the remote WLAN station is an access point.

20. The WLAN station of claim 15, wherein the MAC engine is further configured to transmit transmission control protocol (TCP) data to the remote WLAN station during the TXOP and receive TCP acknowledgments from the remote WLAN station during the TXOP.

* * * * *